United States Patent [19]
Stevenson

[11] 3,750,776
[45] Aug. 7, 1973

[54] MOTORIZED SLED TYPE VEHICLE

[76] Inventor: William J. Stevenson, 416 E. Park Ave., Barberton, Ohio

[22] Filed: Sept. 2, 1970

[21] Appl. No.: 68,826

[52] U.S. Cl. ............................................. 180/6 R
[51] Int. Cl. ........................................ B62m 27/02
[58] Field of Search ...... 180/6, 6 A, 5; 115/1; 114/43

[56] References Cited
UNITED STATES PATENTS
| | | | |
|---|---|---|---|
| 1,530,223 | 3/1925 | Young | 180/5 R |
| 2,706,528 | 4/1955 | Kallio | 180/5 R |
| 3,180,442 | 4/1965 | Pomeroy | 180/6 R |

Primary Examiner—A. Harry Levy
Attorney—William Cleland

[57] ABSTRACT

Motorized sled-type vehicle has power-driven traction wheel carried by motor mount depending from a swivel at the rear of vehicle body supported on laterally spaced skii-type runners. Motor mount controlled by operator, seated in vehicle body, to propel vehicle according to tractional power applied to wheel, and to steer conveyance by turning of motor mount on the swivel. With variable tractional operation of traction wheel against riding surface motor mount pivots toward and from rear of vehicle body according to traction power applied by motor, while runners adjust with respect to body to remain flatwise on riding surface, independently of vertical movement of rear of conveyance body incident to pivotal movement of the motor mount.

8 Claims, 4 Drawing Figures

PATENTED AUG 7 1973
3,750,776
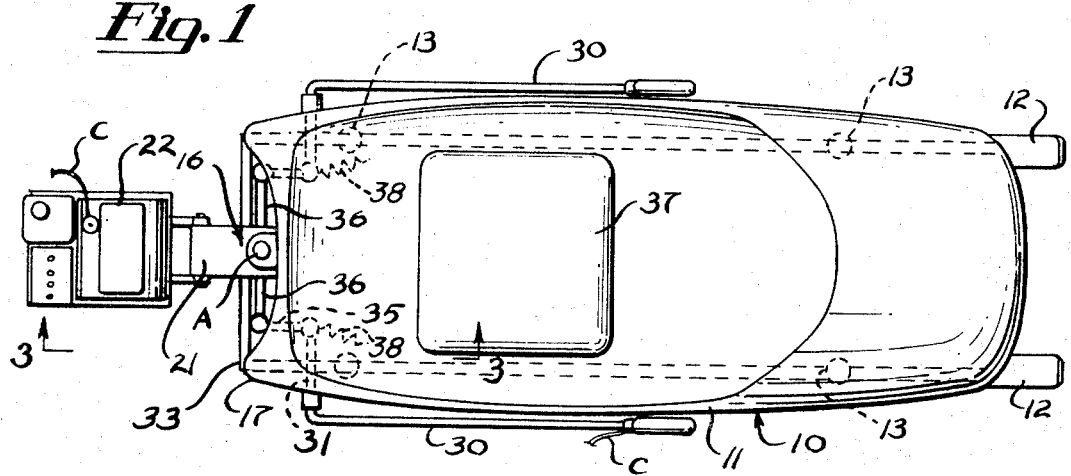
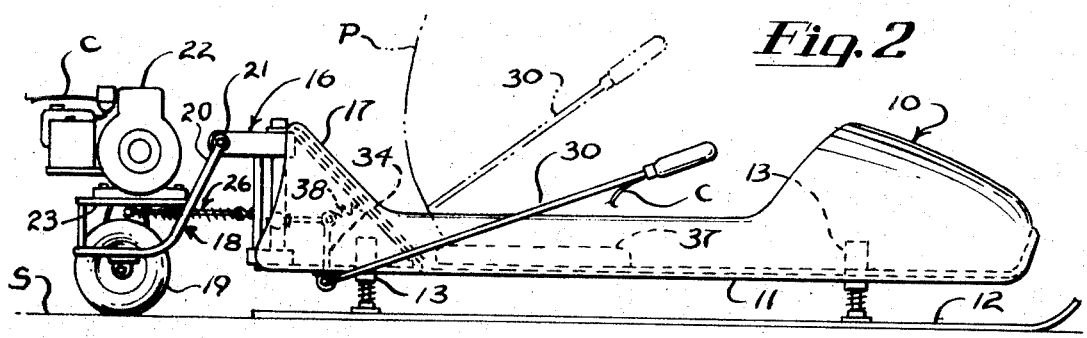
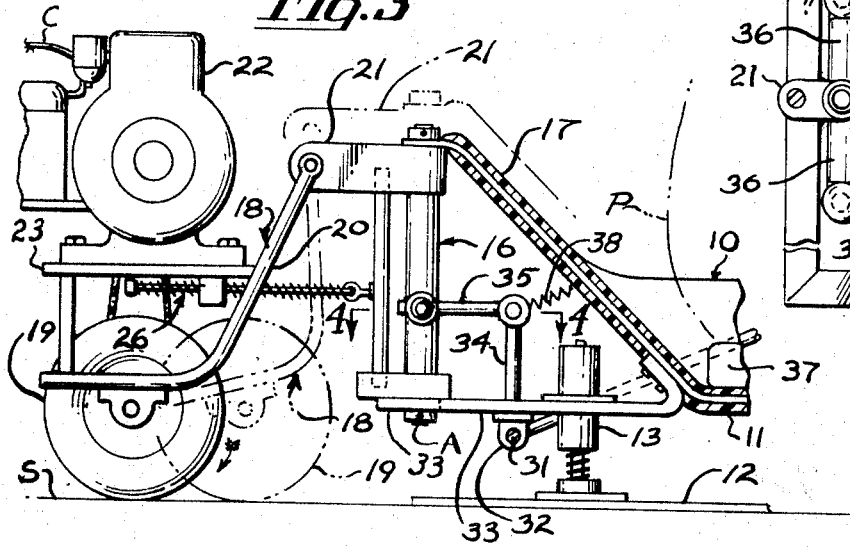
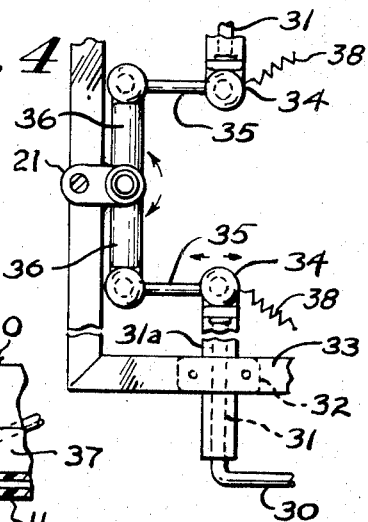
INVENTOR.
William J. Stevenson
BY
William Cleland
Attorney

MOTORIZED SLED TYPE VEHICLE

BACKGROUND OF INVENTION

In the past motorized sleds of various types have been provided which included a vehicle body usually carried by front and rear pairs of laterally spaced runners, and propelled by a motor driven traction wheel or endless belt. Because such traction wheels or endless belts were necessarily mounted beneath the conveyance they were limited in size and/or power capacity, and in any event required that the conveyance be supported substantially high above the driving surface, so that such sled vehicles were dangerously top heavy and subject to capsizing. Moreover, driven traction wheels mounted on pivoted arms were generally inefficient because no means was provided to offset tendency for the wheel-supporting arm to bob freely up and down with the variations in riding surface contours, and whereby increases in power of the motor as applied to the wheel had little or no effect to provide correspondingly increased forward driving power to the wheel against the riding surface.

SUMMARY OF INVENTION

The present invention has for its main object, the provision of an improved motorized sled-type vehicle, for operation on ice and snow, and which is provided with a power-driven traction wheel mounted to utilize the weight of the vehicle to gain increased vehicle driving traction on snow or ice surfaces, resulting in correspondingly increased efficiency gained from the power applied to the wheel. Improved means is provided for yieldingly supporting the vehicle on the sled runners, to maintain the runners flatwise on the driving surface under substantially all conditions of increased speed of the power-operated traction wheel, otherwise tending to cause the traction wheel to move forwardly, toward the rear of the vehicle, and thereby correspondingly to elevate the rear of the vehicle.

The objects of the invention will be manifest from the following brief description and the accompanying drawings.

Of the accompanying drawings:

FIG. 1 is a top plan view of a motorized sled-type vehicle, embodying the features of the invention.

FIG. 2 is a front elevation of the vehicle shown in FIG. 1, in loaded operational condition of the same.

FIG. 3 is an enlarged fragmentary view, taken substantially on the line 3—3 of FIG. 1, partly broken away and in section and particularly illustrating the power operating and steering mechanism for the vehicle.

FIG. 4 is a fragmentary view taken substantially on the line 4—4 of FIG. 3, and on the same scale, to illustrate the steering mechanism in further detail.

Referring to the drawings generally, and to FIGS. 1 and 2 in particular, there is illustrated one embodiment of a motorized sled-type vehicle 10, for operation on snow or ice, including an elongated body 11, supported on a pair of laterally spaced skii-type runners 12,12, to be low-slung with reference to the riding surface S. For this and other purposes to be described later, the body 11 may be yieldingly supported on each runner 12 by means of a pair of longitudinally spaced shock absorbers 13,13, of known general type which allows for adjustable limited resilient movement of each runner with respect to body 11, as well as to maintain each runner flatwise on surface S with variations in vertical movement of the body during operation of the vehicle.

For driving and guiding the vehicle body 11, while so supported on said runners 12, and under the load of the operator at P, said body may be provided with rigid bracket means 16, mounted for strong support on a rigid supporting wall or member 17 affixed to or carried by the body 11, to provide for pivotal movement of the bracket means about a vertical axis at A, coincident with the longitudinal axis of said body as best shown in FIGS. 1 and 3. A motor mounting frame 18, carrying a ground-engaging traction wheel 19, or like equivalent traction member may have an upwardly extending rigid arm 20 pivotally connected to a rearward extension 21 of bracket 16, to pivot from and toward said vertical axis A in a plurality of planes according to variable positions of rotation of bracket 16 about said axis A. The mounting frame 18 carries a gas-operated motor 22, or other power unit, on a platform 23 affixed to the frame 18, which is yieldingly swingable on extension 21 about the pivot 24, to limited extents of forward and rearward tractional travel of wheel 19 on the surface S, substantially as indicated in full and chain dotted lines in FIG. 3. Resilient swingable movement of frame 18 may be accomplished against a double action coil-spring means 26, adjustably connected between the motor platform 23 and a longitudinally oppositely disposed portion of bracket 16.

In unloaded condition of the vehicle body 11 the motor mount 18 is yieldingly retained in the no-load condition indicated in chain-dotted lines in FIG. 3. With the load of the operator in the body 11, as indicated at P, however, the motor mount will be in the rearward, full-load positions, as indicated in full lines in FIGS. 2 and 3. Thus, upon operation of the motor 22 to drive the wheel 19, for forward movement of the loaded vehicle on the runners 12, the wheel will tend to move forwardly in relation to the vehicle body, against yielding resistance of the spring means 26 as well as the weight of the body and a passenger operating the device, and thereby increase the traction-pressure capacity of the wheel against the surface S. In doing so it is readily apparent that with corresponding vertical movement of the rear portion of the vehicle body the rear shock absorbers will yieldingly maintain the skiis 12 firmly flatwise against the surface S, for accomplishing maximum steering efficiency of the vehicle. This result is not possible when contact of the skii runners is not maintained. For this purpose the supports 13 at the front end of the vehicle may comprise either shock absorbers, as described, or simple hinge connections of known types.

For steering the vehicle 10, elongated lever arms 30,30, extend forwardly, at opposite sides of body 11, from stems 31,31, pivotally received through brackets 32,32, which may be secured to rigid means 33 carried by the body 11, as best shown in FIG. 3. The rigid means 33 also serves as part of the aforesaid strong support for the pivoted bracket 16. As best shown in FIG. 4 in conjunction with FIG. 3, inward extensions 31a of the laterally opposite stems 31 may have affixed thereto generally upright rocker arms 34,34, adapted to swing with the respective extensions 31 upon manual swinging movement being applied to the corresponding lever arms 30. Links 35,35, each pivotally connected at one end to the upper end of the respective rocker arm 34 and, at the other end to laterally aligned arms 36,36, affixed to the bracket 16 to turn therewith (see FIGS. 1 to 4). Accordingly, when an operator or passenger P, seated in the vehicle, in the position indicated at 37, swings the levers 30 in opposite directions, the rocker arms 34 moving in opposing directions will, through the arms 36, turn bracket 18 yieldingly, against the restraint of counter-acting spring means 38, 38, extending between the tops of the opposite rocker-arms 34 and the wall 17 of body 10, and thereby yieldingly to turn the motor mount 20 with corresponding angular movement of the traction wheel 19. The levers 30 may be held in given positions to maintain the steering mechanism described for turning the vehicle in various directions, or for maintaining a straight course.

The speed of the motor 22, and therefor the speed of the vehicle, may be adjusted and/or maintained by known means including a control cable C, extending between motor 22 and a hand-grip H on one of the levers 30.

In use of the sled vehicle 10, described above in connection with FIGS. 1 to 4, the operator or passenger (not shown) sits at point 37 in the body 11 and grips one of the control levers 30 in each hand. By means of the operational and speed adjustments referred to in connection with cable C, tractional rotation of the wheel 19 against an ice or snow surface S will drive the vehicle forwardly. With forward movement of the vehicle the operator steers the same in desired forward directions by opposite swinging movements manually applied to the two levers 30, as described above, to swing the traction wheel 19 with the motor mount 18. Upon application of increased power to the traction wheel 19, tending to urge the latter closer to the bracket 16 with correspondingly increased gripping and driving power applied to the surface, any tendency for the body 11 to lift the runners 12 therewith out of contact with the surface S is overcome by operation of the shock-absorbers 13 to spring urge and hold the runners firmly and flatwise against said surface S. Without this feature of the present invention separation of the runners from the surface S would seriously interfere with proper steering of the vehicle.

Moreover, the structure of the present invention makes possible the provision of very low-slung body, by use of which the operator safely rides very close to the riding surface S. This feature, for example, reduces the danger of accidents previously experienced because the operators or riders were required to sit up high on the prior sled-type vehicles, thereby to make the vehicles top heavy with accompanying risk of upsetting the same and riders, which frequently resulted in serious injuries.

Modifications of the invention may be resorted to without departing from the spirit thereof or the scope of the appended claims.

What is claimed is:

1. A power operated sled-type vehicle, as for operation on a riding surface of snow or ice, comprising: a vehicle body having a supporting device carried by said body at the rear thereof; a pivotal member pivotally supported on said supporting device for pivotal movement thereon about a vertical axis; a pair of laterally spaced surface-engaging runners mounted on the underside of said body to support the same on a said surface; mounting means pivoted on said pivotal member and carrying a power-driven traction member to depend from said mounting means for tractional contact of said traction member with said riding surface; restraining means tending yieldingly to urge said mounting means and the traction member thereon forwardly toward the rear of said body against the weight of the same with a load thereon, whereby, upon application of powered tractional contact of said traction member with said riding surface while under load said wheel tends to travel forwardly toward positions of increasing tractional pressures thereof against said surface; and control means operable by turning said pivotal member on said supporting device with corresponding movement of said driven traction wheel, for steering the vehicle.

2. A vehicle as in claim 1, wherein said restraining means includes a spring device.

3. A vehicle as in claim 2, wherein said spring device is a double-acting spring.

4. A vehicle as in claim 3, including means for resiliently supporting said body on said runners to maintain the same flatwise on said surface in all positions of pivotal operation of said mounting means with said traction member tending to elevate the body with respect to the riding surface.

5. A vehicle as in claim 1, including means for resiliently supporting said body on said runners to maintain the same flatwise on said surface in all positions of pivotal operation of said mounting means with said wheel tending to elevate the body with respect to the riding surface.

6. A vehicle as in claim 1, wherein said restraining means includes a spring device and means for resiliently supporting said body on said runners to maintain the same flatwise on said surface in all positions of pivotal operation of said mounting means with said wheel tending to elevate the body with respect to the riding surface.

7. A vehicle as in claim 1, wherein said control means includes pivoted levers at opposite sides of said body, and linkage means operable by manual movement of the levers to pivot said pivotal member.

8. A vehicle as in claim 1, wherein said traction member is a wheel.

* * * * *